3,116,204
PHARMACEUTICAL COMPOSITIONS AND
METHOD OF PREPARING THE SAME
Sheldon Siegel, Westfield, and Edward J. Hanus, Palisade, N.J., and Roy H. Reiner, Kew Gardens, N.Y., assignors to Merck & Co., Inc., Rahway, N.J., a corporation of New Jersey
No Drawing. Filed Nov. 9, 1961, Ser. No. 151,161
12 Claims. (Cl. 167—81)

This invention relates to the preparation of solid vitamin compositions. More particularly, the invention relates to a process for the preparation of vitamin tablets by direct compression.

In the pharmaceutical industry it is a well known fact that very few crystalline or powdered materials can be directly compressed into suitable tablets on automatic tableting equipment. This is particularly true in the case of vitamins. At the present time, there are two well known methods for preparing suitable multi-vitamin tablets, namely, the wet granulation method and the dry method, which is also known as "slugging." The wet method has the following eight separate and distinct production operations:

(1) Preparation of powder blend of vitamins
(2) Preparation of binder solution
(3) Granulation
(4) Screening
(5) Drying
(6) Rescreening
(7) Blending with lubricant and disintegrating agent
(8) Compression The dry slugging method has the following six steps:

(1) Preparation of powder blend of vitamins
(2) Slugging
(3) Grinding slug
(4) Sieving out fines and reslugging them
(5) Blending with lubricant and disintegrating agent
(6) Compression In both of these methods, the amount of equipment, labor, floor space and time required is substantial. The preparation of vitamin tablets by direct compression, on the other hand, would involve only two essential steps, namely, preparation of the powder blend and compression, thereby resulting in substantial production savings. To illustrate, as compared with the wet method, a suitable method for the direct compression of multi-vitamin tablets would eliminate the necessity of separately preparing a binder solution, granulating, screening, drying, rescreening and separately blending with a lubricant and disintegrating agent. As compared with the dry method, direct compression would eliminate the necessity of slugging, grinding the slug, reslugging sieved out fines and separately blending with a lubricant and disintegrating agent. Accordingly, it will be readily apaprent that a method for the direct compression of vitamin tablets whereby numerous steps inherent in both the wet and dry methods presently employed for the preparation of vitamin tablets would result in a vast reduction in the amount of equipment, labor, space and time required for the preparation of multi-vitamin tablets and would be most welcomed by the pharmaceutical industry.

In accordance with the present invention, a method is now provided whereby vitamin tablets can be satisfactorily prepared by direct compression on conventional automatic tableting equipment. The method of the present invention is based upon the discovery that the reaction product obtained by reacting nicotinamide and ascorbic acid, which has been designated in the art as nicotinamide ascorbate, has exceptional compressibility characteristics which permit it to be compressed into tablets on conventional tableting equipment without the necessity for prior granulation or slugging or the inclusion of other excipients such as binders and disintegrating agents which are essential for the successful preparation of vitamin tablets using the wet and dry methods of tableting described hereinabove. It was not heretofore known that nicotinamide ascorbate possessed such desirable properties nor could nicotinamide ascorbate be expected to have such properties in view of the fact that neither nicotinamide or ascorbic acid per se can be formulated into suitable tablets without first preparing a granulation or slug of the vitamins before compressing them into tablets. Because of the exceptional compressibility of nicotinamide ascorbate, it has further been discovered that multi-vitamin tablets, i.e., tablets containing nicotinamide and ascorbic acid in the form of nicotinamide ascorbate and one or more other vitamins which are of themselves also not compressible without prior granulation or slugging may also be prepared in accordance with the present invention.

According to one aspect of the present invention, direct compression of the vitamin tablets is preferably accomplished by admixing preformed nicotinamide ascorbate, i.e., nicotinamide ascorbate prepared in the absence of any other vitamins, with a conventional lubricating agent, such as magnesium stearate, to prevent sticking and promote the flow of powder in the hopper and, if desired, one or more other vitamins which may be desired in the final formulation and directly compressing the resulting non-granulated blend into tablets on automatic tableting equipment.

The nicotinamide ascorbate employed in the present invention may readily be prepared by mixing, in the dry state, ascorbic acid and nicotinamide, preferably in the mole ratio of 1 to 1, until the reaction is essentially complete. Alternatively, the reaction may be carried out in the presence of a suitable solvent such as water, acetone, chloroform or various alcohols which can subsequently be removed. Both of these procedures are more fully described in United States Patent No. 2,433,688 which issued December 30, 1947. A further procedure for the preparation of nicotinamide ascorbate is set forth in British Patent No. 771,317, published March 27, 1957. It will be noted from the above-mentioned patents that nicotinamide ascorbate of varying melting points is obtained depending upon the particular reaction conditions and the mole ratio of reactants employed. For the purpose of this invention, it has been found that the mole percent of nicotinamide in the nicotinamide ascorbate may vary from about 10% to about 90% without adversely affecting the desired results contemplated by the present invention.

In an alternate procedure for the preparation of multi-vitamins by direct compression, the nicotinamide ascorbate, rather than being preformed in the absence of other vitamins, may be prepared as set forth in the above patents except that the reaction of the nicotinamide and ascorbic acid in a suitable solvent at room or elevated temperatures is carried out in the presence of one or more of the other vitamins to be included in the finished tablet. Inasmuch as one or more other vitamins will be present during the reaction, it will be readily apparent that the temperature employed be lower than that at which the vitamin activity of such other vitamins would tend to be degraded. The resulting solid vitamin product may then be dried to remove the solvent, admixed with a lubricating agent and directly compressed into tablets or further blended with other vitamins not previously included and then directly compressed into tablets.

The particle size of the nicotinamide ascorbate and other vitamins to be included in the finished tablet prior to compression is preferably of the same order of magnitude and within the range of from about 30 mesh to about 200 mesh for optimum results. However, particle sizes as low as 12 mesh are satisfactory. As indicated above, it is preferable that the particle size of all the vitamin components be of approximately the same order of magnitude. Accordingly, it will be readily appreciated that the nicotinamide ascorbate and each of the other vitamins may, if necessary, be reduced to the desired particle size separately or, more desirably, they may be reduced simultaneously after blending and before compression.

While the above-mentioned processes provide a means for the preparation of vitamin tablets by direct compression on either single or rotary tablet punching equipment without the inclusion of any other ingredients, it is preferred in the latter instance, i.e., where a rotary punch is utilized to incorporate in the vitamin blend prior to compression, polyethylene glycol or, preferably in equal amounts, spray dried lactose and cellulose. The total amounts of these ingredients desirably constitute at least about 5% to about 40% by weight of the finished tablet. However, substantially higher amounts may be utilized, the only limitations being dictated by the size of the tablet desired. In addition, employing either the single or rotary punch, other excipients as, for example, anti-caking agents such as colloidal silica (Cab-o-sil), fillers such as lactose, and disintegrating agents such as starch, may, if desired, be added to the blend prior to compression, but the inclusion of such ingredients is not necessary.

The following examples are given for purposes of illustrating the method for preparing multi-vitamin tablets by direct compression in accordance with the present invention and are not to be construed as limiting the scope of this invention, which is defined in the appended claims.

*Example 1*

Multi-vitamin tablets having the following composition were prepared by direct compression in the following manner:

| | Per tablet |
|---|---|
| Thiamine mononitrate mg__ | 2.6 |
| Riboflavin mg__ | 2.2 |
| Vitamin $B_{12}$ mcg__ | 2.5 |
| Pyridoxine hydrochloride mg__ | 2.2 |
| Calcium pantothenate mg__ | 3.8 |
| Vitamin A acetate units__ | 6250 |
| Vitamin D do____ | 625 |
| Nicotinamide ascorbate (1 part nicotinamide–2 parts ascorbic acid by weight) mg__ | 66 |
| Nicotinamide ascorbate (1 part nicotinamide–8 parts ascorbic acid by weight) mg__ | 18 |
| Magnesium stearate mg__ | 3 |
| Crystalline cellulose (Avicel) mg__ | 38.1 |
| Spray dried lactose mg__ | 38.1 |

All of the vitamin ingredients except vitamins A and D, previously passed through a 30 mesh screen, and the magnesium stearate, cellulose and spray dried lactose were blended together and milled through a hammer mill to ensure uniformity. The vitamins A and D, previously passed through a 30 mesh screen, were then added and the blend directly compressed into $^{10}\!/_{32}$ tablets on a rotary tablet punch.

*Example 2*

Multi-vitamin tablets having the following composition were prepared by direct compression in the following manner:

| | Per tablet |
|---|---|
| Thiamine mononitrate mg__ | 2.4 |
| Riboflavin mg__ | 2.4 |
| Vitamin $B_{12}$ mcg__ | 2.4 |
| Pyridoxine hydrochloride mg__ | 2.4 |
| Calcium pantothenate mg__ | 3 |
| Vitamin A acetate units__ | 6000 |
| Vitamin D do____ | 600 |
| Nicotinamide ascorbate (1 part nicotinamide–3 parts ascorbic acid by weight) mg__ | 84 |
| Magnesium stearate mg__ | 3 |
| Colloidal silica (Cab-o-sil) mg__ | 1 |
| Spray dried lactose mg__ | 29.9 |
| Polyethylene glycol 4000 mg__ | 7.5 |

All of the vitamin ingredients except vitamins A and D, previously passed through a 30 mesh screen, and the magnesium stearate, colloidal silica, lactose and polyethylene glycol were blended together and milled through a hammer mill to ensure uniformity. The vitamins A and D, previously passed through a 30 mesh screen, were then added and the blend directly compressed into $^{9}\!/_{32}$ tablets on a rotary tablet punch.

*Example 3*

Vitamin tablets having the following composition were prepared by direct compression in the following manner:

| | Per tablet |
|---|---|
| Nicotinamide ascorbate (1 part nicotinamide–3 parts ascorbic acid by weight) mg__ | 140 |
| Magnesium stearate mg__ | 3 |

The ingredients were blended together, passed through an 80 mesh screen and directly compressed into $^{8}\!/_{32}$ tablets on a rotary tablet punch.

*Example 4*

Vitamin tablets having the following composition were prepared by direct compression in the following manner:

| | Per tablet |
|---|---|
| Nicotinamide ascorbate (1 mole nicotinamide–1 mole ascorbic acid) mg__ | 140 |
| Magnesium stearate mg__ | 3 |

The ingredients were blended together and directly compressed into $^{8}\!/_{32}$ tablets on a rotary tablet punch.

*Example 5*

Vitamin tablets having the following composition were prepared by direct compression in the following manner:

| | Per tablet |
|---|---|
| Nicotinamide ascorbate (1 part nicotinamide–3 parts ascorbic acid by weight) mg__ | 140 |
| Ribloflavin mg__ | 2 |
| Magnesium stearate mg__ | 3 |

35 grams of nicotinamide, 115 grams of ascorbic acid and 2 grams of ribloflavin were placed in a blender and an amount of isopropyl alcohol was added sufficient to wet the ingredients. After an elapsed time of about 45 minutes, the mass was air dried to remove the solvent and passed through a 12 mesh screen. 3 grams of magnesium stearate was then added and the blend directly compressed into 1000 $^{8}\!/_{32}$ tablets on a rotary tablet punch.

Various changes and modifications of the invention can be made, and to the extent that such variations incorporate the spirit of the instant invention, they are intended

We claim:

1. A method for the preparation of vitamin tablets containing at least the vitamin activity of nicotinamide and ascorbic acid which comprises directly compressing non-granulated nicotinamide ascorbate into tablets.

2. The method of claim 1 wherein the nicotinamide ascorbate has been formed in the presence of at least one other vitamin.

3. A method for the preparation of vitamin tablets containing at least the vitamin activity of nicotinamide and ascorbic acid which comprises directly compressing non-granulated nicotinamide ascorbate in the presence of a lubricating agent into tablets.

4. A method for the preparation of vitamin tablets containing at least the vitamin activity of nicotinamide and ascorbic acid which comprises directly compressing non-granulated nicotinamide ascorbate having a particle size in the range of from about 30 mesh to about 200 mesh in the presence of a lubricating agent into tablets.

5. A method for the preparation of vitamin tablets containing at least the vitamin activity of nicotinamide and ascorbic acid which comprises directly compressing non-granulated nicotinamide ascorbate in the presence of a lubricating agent, spray dried lactose and cellulose into tablets.

6. A method for the preparation of vitamin tablets containing at least the vitamin activity of nicotinamide and ascorbid acid which comprises directly compressing non-granulated nicotinamide ascorbate in the presence of a lubricating agent and polyethylene glycol into tablets.

7. A method for the preparation of multi-vitamin tablets containing at least the vitamin activity of nicotinamide, ascorbic acid and at least one other vitamin which comprises directly compressing non-granulated nicotinamide ascorbate and at least one other vitamin into tablets.

8. A method for the preparation of multi-vitamin tablets containing at least the vitamin activity of nicotinamide, ascorbic acid and at least one other vitamin which comprises directly compressing non-granulated nicotinamide ascorbate and at least one other vitamin in the presence of a lubricating agent into tablets.

9. A method for the preparation of multi-vitamin tablets containing at least the vitamin activity of nicotinamide, ascorbic acid and at least one other vitamin which comprises directly compressing non-granulated nicotinamide ascorbate at at least one other vitamin in the presence of a lubricating agent, spray dried lactose and cellulose into tablets.

10. A method for the preparation of multi-vitamin tablets containing at least the vitamin activity of nicotinamide, ascorbic acid and at least one other vitamin which comprises directly compressing non-granulated nicotinamide ascorbate and at least one other vitamin in the presence of a lubricating agent and polyethylene glycol into tablets.

11. A method for the preparation of multi-vitamin tablets containing at least the vitamin activity of nicotinamide, ascorbic acid and at least one other vitamin which comprises directly compressing non-granulated nicotinamide ascorbate having a particle size in the range of from about 30 mesh to 200 mesh and at least one other vitamin having a particle size within said above range in the presence of a lubricating agent into tablets.

12. A vitamin tablet containing at least the vitamin activity of nicotinamide and ascorbic acid comprising compressed non-granulated nicotinamide ascorbate.

References Cited in the file of this patent

UNITED STATES PATENTS

| | | |
|---|---|---|
| 2,887,436 | Klioze et al. | May 19, 1959 |
| 2,887,437 | Klioze et al. | May 19, 1959 |
| 2,887,439 | Klioze et al. | May 19, 1959 |
| 3,037,911 | Stoyle et al. | June 5, 1962 |